United States Patent [19]

Figes et al.

[11] 3,995,732
[45] Dec. 7, 1976

[54] CONVEYOR SYSTEMS FOR CIGARETTES OR OTHER SIMILAR ROD-LIKE ARTICLES

[75] Inventors: Victor Charles Figes, Richmond, Va.; Stanley Ivor Bowen, London, England

[73] Assignee: Molins Limited, England

[22] Filed: Apr. 24, 1973

[21] Appl. No.: 354,076

[30] Foreign Application Priority Data
  Apr. 25, 1972 United Kingdom ............ 19177/72

[52] U.S. Cl. ................................ 198/524; 198/341
[51] Int. Cl.² ........................................ B65G 43/08
[58] Field of Search ................................ 198/20–22, 198/37, 40, 76, 78, 83; 73/406; 340/259; 200/61.14, 61.41, 61.42, 61.43

[56] References Cited
UNITED STATES PATENTS

| | | | |
|---|---|---|---|
| 3,254,573 | 6/1966 | Prell | 73/406 |
| 3,561,585 | 2/1971 | McCombie | 198/37 |
| 3,625,116 | 12/1971 | Hluchan | 73/406 |
| 3,749,326 | 7/1973 | Aro | 198/83 |

*Primary Examiner*—Evon C. Blunk
*Assistant Examiner*—Joseph E. Valenza
*Attorney, Agent, or Firm*—Craig & Antonelli

[57] ABSTRACT

A cigarette conveyor system includes a sensor mechanism comprising a sensor member above a junction zone into which cigarettes are arranged to be delivered and from which cigarettes are arranged to be withdrawn, and including a flexible elongated membrane which extends transversely to the axes of the cigarettes and confines the upper surface of the cigarettes in the junction zone and on which the sensor member rests, the ends of the membrane being anchored at two fixed anchorage points, the length of the membrane extending between the anchorage points being greater than the distance between the anchorage points.

16 Claims, 4 Drawing Figures

CONVEYOR SYSTEMS FOR CIGARETTES OR OTHER SIMILAR ROD-LIKE ARTICLES

This invention is concerned with conveyor systems for cigarettes and other similar rod-like articles including, for example, cigarette filter rods. For convenience the term "cigarettes" will be used in this specification to include all such articles.

According to this invention a cigarette conveyor system includes a sensor mechanism comprising a sensor member above a junction zone into which cigarettes are arranged to be delivered and from which cigarettes are arranged to be withdrawn, and including a flexible elongated membrane which extends transversely to the axes of the cigarettes and confines the upper surface of the cigarettes in the junction zone and on which the sensor member rests, the ends of the membrane being anchored at two fixed anchorage points, the length of the membrane extending between the anchorage points being greater than the distance between the anchorage points.

The sensor mechanism may provide a stepless control to a conveyor speed regulating mechanism. Alternatively, the sensor member or members may operate on a bang-bang principal; i.e. switching the conveyor drive motor on or off, for example by operating upper and lower limit switches.

In a preferred arrangement there is provision for mounting ceiling plates which lie above the membrane and extend towards one another from the anchorage points. The lengths of the ceiling plates can be changed to vary the operating characteristics of the system.

Example of sensor mechanisms according to this invention are shown in the accompanying drawings. In these drawings.

Figure 1:
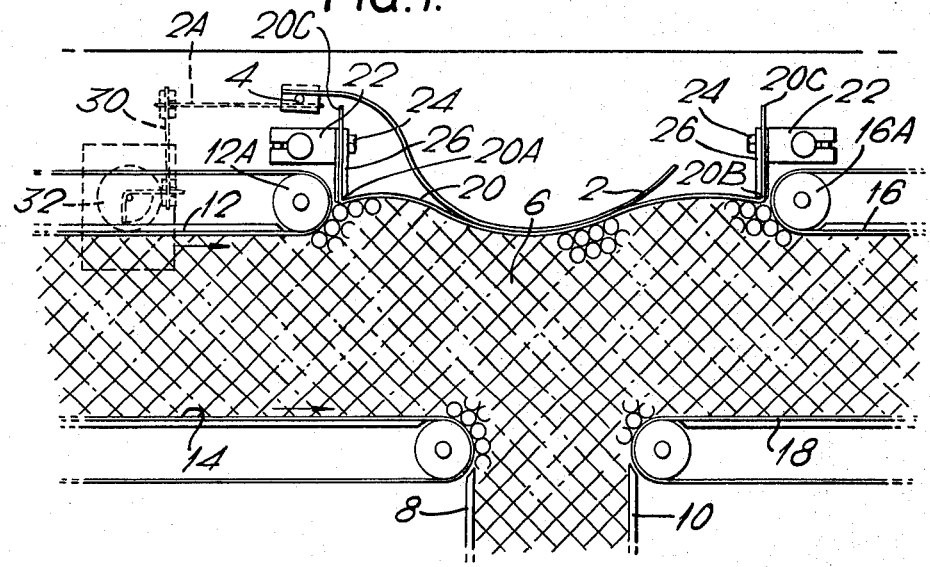
FIG. 1 shows one sensor mechanism positioned above a chute.

The sensor mechanism shown in FIG. 1 comprises a sensor member 2 mounted on a pivot pin 4 so as to move up and down above a junction zone 6 above a chute formed by walls 8 and 10.

A stack of cigarettes is delivered into the junction zone 6 between upper and lower bands 12 and 14 which may run continuously at a set speed. A stack of cigarettes passes down the chute from the junction zone 6, for example to a cigarette packing machine. Furthermore two bands 16 and 18 are provided; these may for example be used to carry a stack of cigarettes continuously away from the junction zone, or they may serve as the entry portion to a cigarette reservoir, in which case the bands 16 and 18 may at times deliver cigarettes into the junction zone.

The cigarettes are confined in the junction zone by a flexible membrane 20 which lies on top of the cigarettes in the junction zone and has its ends anchored at 20A and 20B, these anchorage points being close to the adjacent pulleys 12A and 16A on the top bands, so that the membrane positively prevents any escape of cigarettes. The pivoted sensor member 2 rests on the membrane.

In order to anchor the ends of the membrane, end portions 20C of the membrane are each clamped against a fixed block 22 by means of screws 24 acting through clamping plates 26. The screws 24 pass through slots in the end portions of the membrane, so that the length of unsupported membrane between the anchorage points 20A and 20B can be readily adjusted after releasing the clamping screws 24 at one end.

It will be seen that the length of the membrane extending between the anchorage points 20A and 20B is substantially greater than the distance between the anchorage points.

The end of the sensor member 2 adjacent to the pivot pin 4 carries a lever 2A which is pivotally connected to a connecting rod 30 extending to a crank on a rotary speed regulating mechanism 32 which regulates the speed (and possibly controls the direction of motion) of the bands 16 and 18.

The mean position of the sensor member 2 may be as shown or slightly lower.

Figure 2:
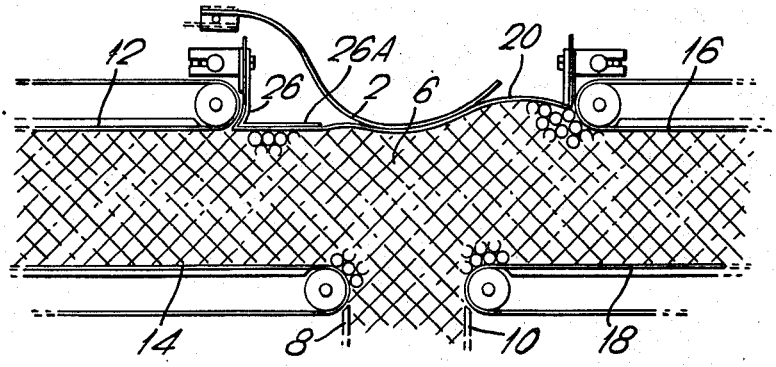
FIG. 2 shows a different sensor mechanism positioned above a chute.

FIG. 2 shows, to a slightly reduced scale, a sensor mechanism which is basically the same as that shown in FIG. 1, as indicated by the use of the same reference numerals. However, in this example the left-hand clamping plate 26 extends further downwards and includes a horizontal part 26A which serves as a ceiling plate limiting upward movement of the membrane 20 in that region. The object of the ceiling plate is to prevent the formation under the sensor member of a cavity, which we have found can occur in certain flow conditions with the result of a possible risk of cigarettes becoming skew. The right-hand clamping plate 26 could also be similarly extended downwards and across, though in this case the horizontal distance (i.e. the ceiling plate section) may be less than that of the ceiling plate 26A.

Figure 3:
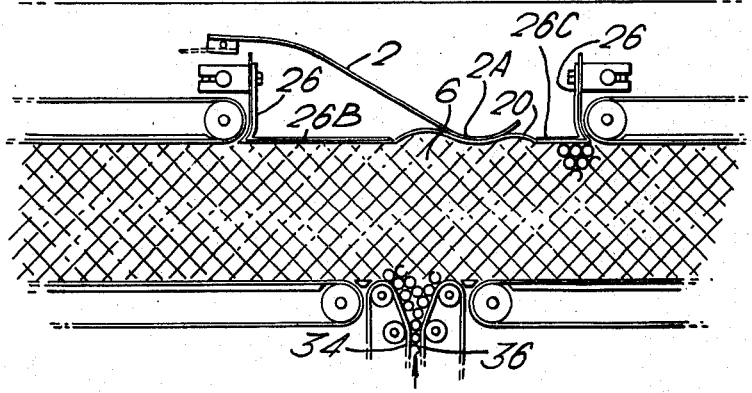
FIG. 3 shows another different sensor mechanism positioned above an upwardly feeding elevator.

FIG. 3 shows basically the same sensor mechanism again, but in this case the clamping plates 26 are both extended to form two ceiling plates 26B and 26C, and the sensor member 2 has a narrower convex end portion 2A to contact the membrane 20. The sensor mechanism shown in FIG. 3 is suitable for mounting above a cigarette elevator comprising bands 34 and 36 which feed upwards a single row of cigarettes and inject the cigarettes into the junction zone 6.

It will be seen that basically the same sensor mechanism is used in all three FIGS. 1 to 3. However, the shape of the sensor member 2 is different in FIG. 3, and the three arrangements also differ in regard to the use or length of a ceiling plate. One particular system in which the illustrated sensor mechanisms can be used is shown in FIG. 4.

Figure 4:
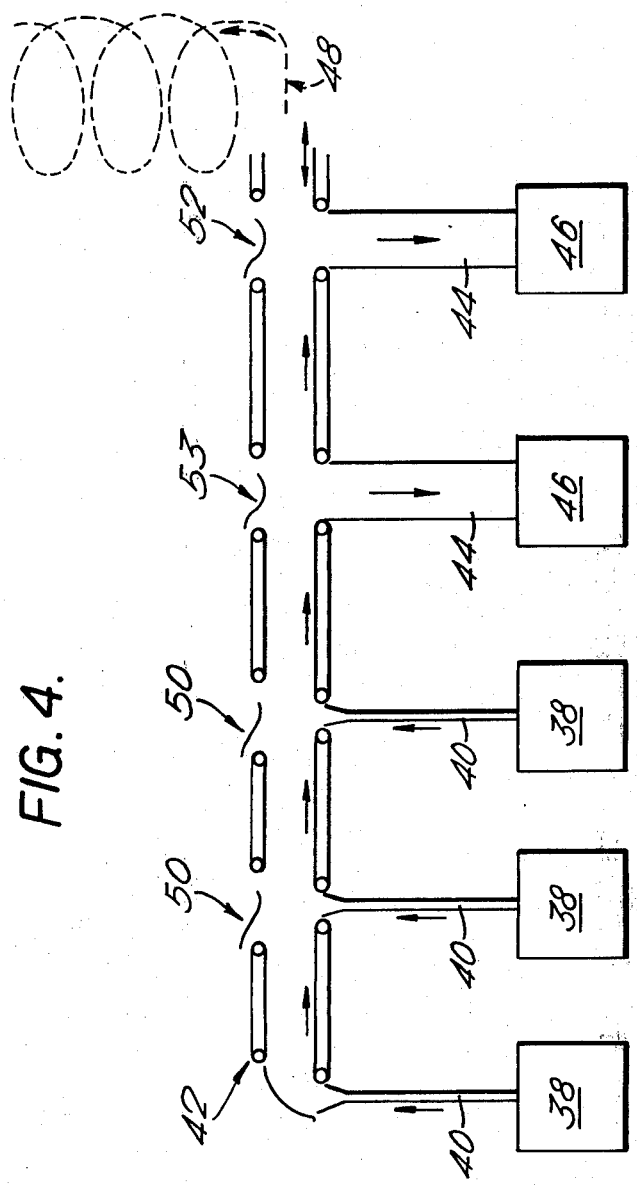
FIG. 4 shows diagrammatically a complete cigarette conveyor system in which the sensor mechanisms can be used.

As shown in FIG. 4, three cigarette making machines 38 each deliver upwards a continuous single-row stream of cigarettes via an elevator 40 to an overhead horizontal conveyor system 42. A stack of cigarettes is carried by the conveyor system towards junction zones above chutes 44 leading to two cigarette packing machines 46. A reversible conveyor 48 extends along a helical path so as to receive any excess or make up any deficiency of cigarettes to the junction zone above the adjacent chute 44 and possibly also the junction zone above the other chute 44.

The general arrangement may be basically as described in British patent specification No. 1,299,174.

A sensor mechanism such as that shown in FIG. 3 may be used at the positions 50. At the positions 52 and 53 there are preferably sensor mechanisms as shown in FIGS. 1 and 2 respectively.

Instead of the single sensor member shown in each of FIGS. 1 to 3, there could be two sensor members, as described and shown in FIGS. 22 and 23 of the above mentioned patent specification.

It should be noted that the anchorage points 20A and 20B in FIG. 1 are at the same height as the axes of the adjacent pulleys 12A and 16A. However, the anchorage points in FIG. 3 (and the left-hand one in FIG. 2) are adjacent to and level with the bottoms of the pulleys, at the junctions between the ceiling plates 26A, 26B and 26C and the main vertical parts of the respective clamping plates 26. It will be understood that the clamping plates 26 in FIG. 1 could be extended downwards and round the adjacent pulleys as in FIG. 3 (even without the addition of the ceiling plates) if it is desired to lower the anchorage points.

We claim:

1. A cigarette conveyor system comprising means defining a junction zone; first and second conveyor means for feeding cigarettes respectively into and out of the junction zone; a sensor mechanism comprising a sensor member above the junction zone and a flexible elongated membrane which extends transversely to the axes of the cigarettes and confines the upper surface of the cigarettes in the junction zone and on which the sensor member rests; anchorage means for securing the ends of the membrane at two fixed anchorage points against downward and upward movement, the length of the membrane extending between the anchorage points being greater than the distance between the anchorage points; a ceiling plate, above the membrane, extending substantially horizontally from one of the anchorage points in the direction towards the other anchorage point to limit upward movement of part of the membrane; and control means responsive to movement of the sensor member to control the operation of one of said conveyor means.

2. A system according to claim 1 in which the sensor member is pivotally mounted.

3. A system according to claim 1 in which the sensor member controls a mechanism for continuously varying the speed and possibly the direction of the said one conveyor.

4. A system according to claim 1 in which the first and second conveyor means comprise substantially horizontal conveyors extending in opposite directions on opposite sides of the junction zone, and stack determining means including cooperating top bands passng around respective pulleys for confining the upper surface of a stack of cigarettes on the conveyors.

5. A system according to claim 4 in which each anchorage point is adjacent to a pulley around which the corresponding top band passes.

6. A system according to claim 5 in which each anchorage point is substantially at the same height as the axis of the adjacent pulley.

7. A system according to claim 5 in which each anchorage point is adjacent to the bottom of the adjacent pulley.

8. A system according to claim 4 including a chute below the junction zone for delivering downwards a stack of cigarettes, the distance between the anchorage points of the membrane being substantially greater than the width of the chute.

9. A system according to claim 1 in which the length of the portion of the membrane extending between the anchorage points is adjustable.

10. A system according to claim 1 in which at least one end of the membrane is anchored by clamping means comprising a releasable clamping plate whereby, after release of the clamping plate, part of the length of the membrane can be pulled through the clamping means in either direction to selectively increase or decrease the length of the portion of the membrane extending between the anchorage points.

11. A system according to claim 10 in which the ceiling plate is an extension of the clamping plate.

12. A cigarette conveyor system comprising two conveyors extending substantially horizontally in opposite directions from a junction zone for carrying stacks of laterally oriented cigarettes; conveyor means extending downwards from the junction zone for conveying cigarettes into or out of the junction zone; top wall means above and parallel to each conveyor for confining the top surface of the stack on the respective conveyor in a region adjacent to the junction zone; a flexible elongated membrane lying above the junction zone and having its ends anchored at fixed anchorage points respectively adjacent to the two top wall means, at least one end being anchored by being clamped between a fixed member and a releasable clamping plate whereby the length of unsupported membrane extending between the anchorage points can be adjusted by releasing the clamping plate and moving the membrane relative to the fixed member and clamping plate in the appropriate direction, the said length of unsupported membrane being greater than the distance between the two anchorage points; and sensing means for sensing the height of the cigarettes in the junction zone and control means responsive to said sensing means for controlling said conveyor means to regulate the delivery of cigarettes to or from the junction zone.

13. A conveyor system according to claim 12 in which the sensing means comprises a pivoted member resting on the membrane.

14. A conveyor system according to claim 12 including, above the membrane, a ceiling plate extending substantially horizontally from one of the anchorage points in the direction towards the other anchorage point to limit upward movement of part of the membrane.

15. A conveyor system comprising means defining a junction zone; first horizontal conveyor means for continuously feeding a stack of cigarettes into the junction zone; second horizontal conveyor means for feeding a stack of cigarettes into or out of the junction zone; means including a chute for feeding a stack of cigarettes downwards from the junction zone; a flexible elongated membrane which extends transversely to the axes of the cigarettes and confines the upper surface of the cigarettes in the junction zone; means for anchoring the ends of the membrane at two fixed anchorage points spaced apart by a distance greater than the width of the chute, the length of the membrane extending between the anchorage points being greater than the said distance between the anchorage points; and a movable sensor member which rests on the membrane, contacting the membrane over an area intermediate the anchorage points and spaced therefrom, and which controls the speed of the second conveyor means, movement of the sensor member in opposite directions having the effect of respectively increasing and decreasing the speed of the second conveyor means.

16. A conveyor system according to claim 15 in which the means for feeding a stack of cigarettes downwards from the junction zone is adapted to feed a stack of a thickness approximately equal to the thickness of the stack on either of the first and second horizontal conveyor means.

* * * * *